United States Patent
Yoshida et al.

(10) Patent No.: US 11,760,694 B2
(45) Date of Patent: Sep. 19, 2023

(54) ALUMINA SINTERED BODY AND MANUFACTURING METHOD THEREFOR

(71) Applicant: CoorsTek KK, Tokyo (JP)

(72) Inventors: Sayuki Yoshida, Aichi (JP); Yukihisa Miyashita, Aichi (JP)

(73) Assignee: CoorsTek KK, Tokyo (JP)

( * ) Notice: Subject to any disclaimer, the term of this patent is extended or adjusted under 35 U.S.C. 154(b) by 542 days.

(21) Appl. No.: 16/753,756

(22) PCT Filed: Oct. 2, 2018

(86) PCT No.: PCT/JP2018/036914
§ 371 (c)(1),
(2) Date: Apr. 3, 2020

(87) PCT Pub. No.: WO2019/069939
PCT Pub. Date: Apr. 11, 2019

(65) Prior Publication Data
US 2020/0270179 A1  Aug. 27, 2020

(30) Foreign Application Priority Data

| Oct. 5, 2017 | (JP) | 2017-195292 |
| Sep. 25, 2018 | (JP) | 2018-178652 |
| Sep. 26, 2018 | (JP) | 2018-180299 |

(51) Int. Cl.
*C04B 35/119* (2006.01)
*C04B 41/00* (2006.01)
(Continued)

(52) U.S. Cl.
CPC ...... *C04B 35/119* (2013.01); *C04B 35/62695* (2013.01); *C04B 35/64* (2013.01);
(Continued)

(58) Field of Classification Search
None
See application file for complete search history.

(56) References Cited

U.S. PATENT DOCUMENTS 4,678,762 A * 7/1987 Agarwal ............... C04B 35/111
501/153
6,423,400 B1  7/2002 Yushio et al.
(Continued)

FOREIGN PATENT DOCUMENTS

| CN | 107001148 A | 8/2017 |
| JP | S62-091462 A | 4/1987 |

(Continued)

OTHER PUBLICATIONS

International Search Report for related Int. App. PCT/JP/2018/036914 dated Dec. 10, 2018. English translation provided; 4 pages.

(Continued)

*Primary Examiner* — Haroon S. Sheikh
(74) *Attorney, Agent, or Firm* — Procopio, Cory, Hargreaves & Savitch LLP (57) ABSTRACT

The present invention relates to an alumina sintered body and a manufacturing method therefor; for example, the present invention relates to an alumina sintered body that is suitably utilized for a member or similar used in a plasma processing device, an etcher for semiconductor/liquid crystal display device manufacturing, a CVD device, or similar, or that is suitably utilized for a substrate or similar of a plasma-resistant member which is to be coated, as well as a manufacturing method for said alumina sintered body.

9 Claims, 1 Drawing Sheet

(51) Int. Cl.
*C04B 35/64* (2006.01)
*C04B 35/626* (2006.01)
(52) U.S. Cl.
CPC .... *C04B 41/009* (2013.01); *C04B 2235/3201* (2013.01); *C04B 2235/3206* (2013.01); *C04B 2235/3208* (2013.01); *C04B 2235/3217* (2013.01); *C04B 2235/3225* (2013.01); *C04B 2235/3244* (2013.01); *C04B 2235/3418* (2013.01); *C04B 2235/656* (2013.01); *C04B 2235/6582* (2013.01); *C04B 2235/786* (2013.01)

(56) References Cited

U.S. PATENT DOCUMENTS

| | | | |
|---|---|---|---|
| 6,834,613 | B1 | 12/2004 | Miyazaki et al. |
| 2004/0138047 | A1 | 7/2004 | Yamada et al. |
| 2004/0224125 | A1 | 11/2004 | Yamada et al. |
| 2006/0037536 | A1 | 2/2006 | Kobayashi et al. |
| 2012/0171450 | A1* | 7/2012 | Ozaki ..................... C04B 35/64 423/625 |
| 2013/0065067 | A1* | 3/2013 | Nishimura ............ H01L 31/052 136/246 |
| 2013/0084450 | A1 | 4/2013 | Murata et al. |
| 2014/0300064 | A1 | 10/2014 | Inaba et al. |
| 2015/0101255 | A1* | 4/2015 | Lee ........................ C04B 35/624 51/303 |
| 2017/0250519 | A1 | 8/2017 | Kuraoka et al. |
| 2018/0044195 | A1 | 2/2018 | Matsushima et al. |
| 2018/0179664 | A1 | 6/2018 | Watanabe et al. |
| 2018/0179665 | A1 | 6/2018 | Watanabe et al. |
| 2018/0190527 | A1 | 7/2018 | Watanabe et al. |
| 2018/0230020 | A1 | 8/2018 | Matsushima et al. |
| 2018/0237343 | A1 | 8/2018 | Sato et al. |
| 2018/0244579 | A1 | 8/2018 | Watanabe et al. |
| 2018/0350918 | A1 | 12/2018 | Imai et al. |
| 2018/0351038 | A1 | 12/2018 | Watanabe et al. |
| 2018/0351041 | A1 | 12/2018 | Imai et al. |

FOREIGN PATENT DOCUMENTS

| | | |
|---|---|---|
| JP | H05217946 A | 8/1993 |
| JP | H08143358 A | 6/1996 |
| JP | H10-120461 A | 5/1998 |
| JP | H11-274149 A | 10/1999 |
| JP | 2000072529 A | 3/2000 |
| JP | 2000-247728 A | 9/2000 |
| JP | 2000290063 A | 10/2000 |
| JP | 2000344569 A | 12/2000 |
| JP | 2001240461 A | 9/2001 |
| JP | 2001-308163 A | 11/2001 |
| JP | 2003-112963 A | 4/2003 |
| JP | 2004217478 A | 8/2004 |
| JP | 2004-323268 A | 11/2004 |
| JP | 2007-119334 A | 5/2007 |
| JP | 2007-269524 A | 10/2007 |
| JP | 2008-087985 A | 4/2008 |
| JP | 2008-266069 A | 11/2008 |
| JP | 2013095973 A | 5/2013 |
| JP | 2013155098 A | 8/2013 |
| JP | 2013180909 A | 9/2013 |
| JP | 2014-009119 A | 1/2014 |
| JP | 2005225745 A | 8/2015 |
| JP | 2015163569 A | 9/2015 |
| JP | 2016-184513 A | 10/2016 |
| JP | 2017-095333 A | 6/2017 |
| TW | 201427923 A | 7/2014 |
| TW | 201730134 A | 9/2017 |
| WO | 2017-057551 A | 9/2016 |

OTHER PUBLICATIONS

Written Opinion of the International Searching Authority for related int. App. PCT/JP/2018/036914 dated Dec. 18, 2018; 6 pages.
Office Action for related TW App. No. 107135180 dated Apr. 24, 2019. English translation provided; 9 pages.
Office Action for related TW App. No. 107135180 dated Nov. 4, 2019. English translation provided; 7 pages.
International Preliminary Report on Patentability for related JP App. No. WO2019069939 dated Jan. 20, 2020. English translation provided; 14 pages.
China National Intellectual Property Administration, the Second Office Action, Application No. 201880065428.0, dated Apr. 19, 2022, in 14 pages.
Japanese Patent Office, Information Offer Form, Application No. 2018-178652, dated Feb. 21, 2022, in 15 pages.
Japanese Patent Office, Information Offer Form, Application No. 2018-180299, dated Feb. 21, 2022, in 12 pages.
Japanese Patent Office, Notice of Reasons for Refusal, Application No. 2018-178652, dated May 2, 2022, in 9 pages.
Japanese Patent Office, Notice of Reasons for Refusal, Application No. 2018-180299, dated May 2, 2022, in 12 pages.
JP—Information offer 2018-178652 on Dec. 1, 2021.
JP—Information offer 2018-180299 on Dec. 1, 2021.
The State Intellectual Property Office of People's Republic of China, Chinese Application No. CN 201880065428.0, dated Sep. 2, 2021, in 17 pages.
Notification of Reason for Refusal for related KR App. No. 10-2020-7009705 dated Jul. 23, 2021, 15 pages.
China National Intellectual Property Administration, The Third Office Action, Application No. 201880065428.0, dated Sep. 19, 2022, in 17 pages.
Japanese Patent Office, Notice of Reasons for Refusal, Application No. JP2018-180299, dated Sep. 6, 2022, in 4 pages.

* cited by examiner

ALUMINA SINTERED BODY AND MANUFACTURING METHOD THEREFOR

CROSS-REFERENCE TO RELATED APPLICATIONS

This application is a US. National Stage entry of PCT Application. No. PCT/JP2018/036914, filed on Oct. 2, 2018, which claims priority to JP Application No. 2018-180299, filed Sep. 26, 2018, which claims priority to JP Application No. 2018-178652, filed Sep. 25, 2018, which claims priority to JP Application No. 2017-195292, filed Oct. 5, 2017. The contents of the foregoing are incorporated by reference.

TECHNICAL FIELD

The present invention relates to an alumina-based sintered object and a process for producing the same. More particularly, the present invention relates to an alumina-based sintered object which is suitable for use as, for example, members for use in plasma treatment devices, etchers for semiconductor/liquid-crystal display device production, CVD devices, etc., or is suitable for use as, for example, the substrates of plasma-resistant members which are to be coated, and also relates to a process for producing the alumina-based sintered object.

BACKGROUND ART

Alumina-based sintered objects are excellent in terms of heat resistance, chemical resistance, and plasma resistance and have a small dielectric loss tangent (tan δ) in a high-frequency region. Alumina-based sintered objects are hence used, for example, as members for use in plasma treatment devices, etchers for semiconductor/liquid-crystal display device production, CVD devices, etc., or as the substrates of plasma-resistant members which are to be coated.

Various proposals have been made in order to improve the corrosion resistance and dielectric loss tangent (dielectric loss) of the alumina-based sintered objects.

For example, Patent Document 1 proposes an alumina-based sintered object which has an Na content, in terms of $Na_2O$ content, of 30 ppm to 500 ppm of all the constituent components and an Al content, in terms of $Al_2O_3$ content, of 99.4% by mass or higher based on all the constituent components and has a value of dielectric loss tangent at 8.5 GHz which is up to 0.5 times the Na content in terms of $Na_2O$ content, for the purpose of providing: an alumina-based sintered object having high corrosion resistance and having a small dielectric loss tangent although containing an Na oxide; a member for semiconductor production devices; and a member for liquid-crystal panel production devices.

Patent Document 2 proposes an alumina-based sintered object which has an $Al_2O_3$ content in the range of 99.4% to 99.8% by mass and an Si content, in terms of $SiO_2$ content, in the range of 0.11% to 0.38% by mass and in which the deviation of crystal grain diameter in each of a surface-layer part and an inner part is 0.06 μm or less and the deviation of the proportion of crystals with a grain diameter of 6.5 μm or larger in each of the surface-layer part and the inner part is 0.6% or less, for the purpose of providing an alumina-based sintered object capable of differing in dielectric loss tangent between different positions and a process for producing the sintered object.

Patent Document 3 proposes an alumina-based sintered object which has an $Al_2O_3$ purity of 99.3 wt % or higher and contains solute Ti in the $Al_2O_3$ crystal grains in an amount in the range of 0.08 wt % to 0.20 wt % in terms of $TiO_2$ amount and in which Si is contained in an amount in the range of 0.05 wt % to 0.40 wt % in terms of $SiO_2$ amount, for the purpose of providing an alumina-based sintered object which can stably has a reduced dielectric loss tangent while retaining improved processability and a process for producing the sintered object.

Patent Document 4 proposes a technique in which in cases when lower cost or substrate strength is required for producing a plasma-resistant member, a plasma-resistant film including $Y_2O_3$ or YAG is formed on a surface of an alumina ceramic substrate.

Furthermore, with respect to film formation, Patent Document 5, for example, indicates that a thermal-sprayed ceramic coating film having a thickness of 200 μm or less is formed on a surface of a base member for configuring a semiconductor production device. Patent Document 5 indicates that the thermal-sprayed film has a porosity of 5% to 10%.

CITATION LIST

Patent Document

Patent Document 1: JP-A-2015-163569
Patent Document 2: JP-A-2013-155398
Patent Document 3: JP-A-2013-180909)
Patent Document 4: JP-A-2005-225745
Patent Document 5: JP-A-2013-95973

SUMMARY OF INVENTION

Technical Problem

In the members for semiconductor production devices shown in Patent Documents 4 and 5, which have thermal-sprayed ceramic coating film, the thermal-sprayed coating film has a thickness of about 200 pun and a porosity of 5% to 10%. There has hence been a concern that in cases when these members are used in the state of being exposed to plasma, the thermal-sprayed coating film might partly peel off to generate particles.

Meanwhile, due to the nowadays diversification of film deposition techniques, the thermal-sprayed films tend to have smaller thicknesses, e.g., about several micrometers. There has hence been a problem in that in depositing a film having a reduced thickness by thermal spraying on a substrate, even film deposition is inhibited by pores present in the substrate.

Although several proposals have been made with regard to the corrosion resistance and dielectric loss tangent (dielectric loss) of alumina-based sintered objects as shown in Patent Documents 1 to 3, no proposals have been made on any alumina-based sintered object on which a dense film can be evenly deposited by thermal spraying, so far as the present applicant knows.

Under these circumstances, the present inventors diligently made investigations in order to develop an alumina-based sintered object suitable for use as a plasma-resistant-member substrate to be coated. As a result, the present inventors have conceived of an alumina-based sintered object that has both corrosion resistance and low-dielectric-loss characteristics and is suitable for use as a substrate on which a dense film can be evenly deposited. The present invention has been thus completed.

An object of the present invention is to provide: an alumina-based sintered object which has both corrosion resistance and low-dielectric-loss characteristics and on which a dense film can be evenly deposited; and a process for producing the alumina-based sintered object.

Solution to Problem

In order to accomplish the object, the present invention provides, in a first aspect thereof, an alumina-based sintered object having an Al content, in terms of $Al_2O_3$ content, of 70% by weight or higher, in which the alumina-based sintered object has a Zr content, in terms of $ZrO_2$ content, of 30% by weight or less, an Si content, in terms of $SiO_2$ content, of 170 ppm to 600 ppm, and an Na content, in terms of $Na_2O$ content, of 27 ppm or less.

The alumina-based sintered object having the specific configuration according to the first aspect of the present invention has both corrosion resistance and low-dielectric-loss characteristics.

Specifically, the alumina-based sintered object has a dielectric loss tangent tan δ of $10^{-3}$ or less. Furthermore, the alumina-based sintered object has so small a number of pores that, when a thin film is formed on the surface thereof, the number of voids on the surface of the thin film is 100 or less in a region of about 200 μm×200 μm and an average diameter of the voids is 5 μm or less. Namely, an even and dense film can be deposited on the substrate.

In addition, the alumina-based sintered object according to the first aspect has high flexural strength. Specifically, this alumina-based sintered object has a three-point bending strength of 320 MPa or higher.

It is desirable that the $Al_2O_3$ crystals contained in the alumina-based sintered object have an average crystal grain diameter of 3 μm to 15 μm.

This makes it possible to deposit an even film on the surface of the alumina-based sintered object.

In order to accomplish the object shown above, the present invention provides, in a second aspect thereof, an alumina-based sintered object having an Al content, in terms of $Al_2O_3$ content, of 70% by weight or higher, in which the alumnina-based sintered object has a Zr content, in terms of $ZrO_2$ content, of 30% by weight or less, a Y content, in terms of $Y_2O_3$ content, of 1% to 10% by weight, an Si content, in terms of $SiO_2$ content, of 170 ppm to 600 ppm, and an Na content, in terms of $Na_2O$ content, of 27 ppm or less, and the Y content, in terms of $Y_2O_3$ content, is not more than the Zr content, in terms of $ZrO_2$ content.

The alumina-based sintered object having the specific configuration according to the second aspect of the present invention has both corrosion resistance and low-dielectric-loss characteristics.

Specifically, this alumina-based sintered object has a dielectric loss tangent tan δ of $10^{-3}$ or less. Furthermore, the alumina-based sintered object has so small a number of pores that, when a thin film is formed on the surface thereof, the number of voids on the surface of the thin film is 100 or less in a region of about 200 μm×200 μm and an average diameter of the voids is 5 μm or less. Namely, an even and dense film can be deposited on the substrate.

In addition, this alumina-based sintered object has high flexural strength. Specifically, this alumina-based sintered object has a three-point bending strength of 320 MPa or higher.

It is desirable that the $Al_2O_3$ crystals contained in this alumina-based sintered object have an average crystal grain diameter of 3 μm to 15 μm.

This makes it possible to deposit an even film on the surface of the alumina-based sintered object.

Furthermore, in order to accomplish the object shown above, the present invention provides, in a third aspect thereof, an alumina-based sintered object having an Al content, in terms of $Al_2O$ content, of 99.8 wt % or higher, in which the alumina-based sintered object has an Si content, in terms of $SiO_2$ content, of 170 ppm to 600 ppm and an Na content, in terms of $Na_2O$ content, of 27 ppm or less, and the alumina-based sintered object has a density of 3.96 g/cm³ or higher.

The alumina-based sintered object having the specific configuration according to the third aspect of the present invention has both corrosion resistance and low-dielectric-loss characteristics. Furthermore, this alumina-based sintered object has denseness, with a density of 3.96 g/cm³ or higher. As a result, this alumina-based sintered object has so small a number of pores that an even and dense film can be deposited on a surface of the substrate.

In the third aspect of the present invention, it is desirable that the alumina-based sintered object contains Mg in an amount which, in terms of MgO content, is 1.0 to 4.0 times the Si content in terms of $SiO_2$ content.

It is desirable that the alumina-based sintered object contains Ca in an amount which, in terms of CaO content, is up to 3.0 times the Si content in terms of $SiO_2$ content.

It is also desirable that the alumina-based sintered object has an average pore diameter of 5 μm or less. It is desirable that the $Al_2O_3$ crystals contained in the alumina-based sintered object have an average crystal grain diameter of 3 μm to 40 μm.

Furthermore, a corrosion-resistant film or a corrosion-resistant layer may be formed on at least a part of this alumina-based sintered object.

This alumina-based sintered object according to the present invention may be produced by granulating and molding a raw-material powder to obtain a molded object and firing the molded object in a hydrogen atmosphere at 1,600° C. to 1,900° C.

Advantageous Effects of Invention

According to the present invention, it is possible to obtain an alumina-based sintered object which has both corrosion resistance and low-dielectric-loss characteristics. According to the present invention, it is also possible to obtain an alumina-based sintered object in which, when a film is formed on the surface thereof, a dense film can be evenly formed.

DESCRIPTION OF EMBODIMENTS

The alumina-based sintered object of a first embodiment according to the first aspect of the present invention is explained below.

The alumina-based sintered object according to the first embodiment is an alumina-based sintered object having an Al content, in terms of $Al_2O_3$ content, of 70% by weight or higher, in which the alumina-based sintered object has a Zr content, in terms of $ZrO_2$ content, of 30% by weight or less, an Si content, in terms of $SiO_2$ content, of 170 ppm to 600 ppm, and an Na content, in terms of $Na_2O$ content, of 27 ppm or less.

This alumina-based sintered object has high flexural strength, has both corrosion resistance and low-dielectric-loss characteristics, and serves as a substrate on which an even and dense film can be deposited.

This alumina-based sintered object has an Al content, in terms of $Al_2O_3$ content, of 70% by weight or higher and has a Zr content, in terms of $ZrO_2$ content, of 30% by weight or less.

In this alumina-based sintered object, a $ZrO_2$ crystal phase has been formed besides the main crystals of $Al_2O_3$. This $ZrO_2$ crystal phase not only contributes to a reduction in the amount of pores but also is inhibited from undergoing abnormal grain growth and has a reduced grain diameter. The $ZrO_2$ crystal phase hence serves to enhance the strength.

However, in case where the Zr content in terms of $ZrO_2$ content exceeds 30% by weight, the Al content in terms of $Al_2O_3$ content is less than 70% by weight and this alumina-based sintered object does not have high resistance to corrosion by highly reactive halogen-based corrosive gases or plasmas thereof. Such Zr contents are hence undesirable.

In addition, in case where the Zr content in terms of $ZrO_2$ content exceeds 30% by weight, the $ZrO_2$ crystal phase is present in an increased amount and this results in a decrease in the strength of the alumina-based sintered object. Furthermore, the dielectric loss tangent tan δ exceeds $10^{-3}$. Such Zr contents are hence undesirable.

Consequently, the Al content in terms of $Al_2O_3$ content is 70% by weight or higher, and the Zr content in terms of $ZrO_2$ content is 30% by weight or less.

Any ingredients contained in the alumina-based sintered object other than $Al_2O_3$ and $ZrO_2$ are substances which have unavoidably come into the alumina in the steps for alumina production. Examples thereof include Si, Mg, Na, and Ca.

In this alumina-based sintered object, the Si content in terms of $SiO_2$ content is 170 ppm to 600 ppm.

In case where the Si content in terms of $SiO_2$ content is less than 170 ppm, silicates which are necessary for imparting low-dielectric-loss characteristics are not evenly formed, resulting in an increase in dielectric loss and making it impossible to obtain the effect of power saving. Such Si contents are hence undesirable.

Meanwhile, in case where the Si content in terms of $SiO_2$ content exceeds 600 ppm, this alumina-based sintered object has a low density and is not dense. Such Si contents are hence undesirable.

In the alumina-based sintered object according to the first embodiment, the Na content in terms of $Na_2O$ content is 27 ppm or less. In case where the Na content in terms of $Na_2O$ content exceeds 27 ppm, this alumina-based sintered object has an increased dielectric loss and does not have the effect of power saving. Such Na contents are hence undesirable.

It is preferable that, in the alumina-based sintered object according to the first embodiment, the content of Mg, in terms of MgO content, is 1.0 to 4.0 times the Si content in terms of $SiO_2$ content.

In cases when the content of Mg, in terms of MgO content, is 1.0 to 4.0 times the Si content in terms of $SiO_2$ content, silicates can be formed at grain boundaries of the alumina-based sintered object. Hence, an alumina-based sintered object having a high density and a low dielectric loss can be obtained.

It is preferable that in the alumina-based sintered object according to the first embodiment, the content of Ca, in terms of CaO content, is up to 3.0 times the Si content in terms of $SiO_2$ content.

In cases when the content of Ca, in terms of CaO content, is up to 3.0 times the Si content in terms of $SiO_2$ content, silicates can be formed at grain boundaries. Hence, an alumina-based sintered object having a low dielectric loss can be obtained.

It is preferable that, in the alumina-based sintered object according to the first embodiment, the $Al_2O_3$ crystals have an average crystal grain diameter of 3 μm to 15 μm.

In cases when the $Al_2O_3$ crystals contained in the alumina-based sintered object have an average crystal grain diameter of 3 μm to 15 μm, this alumina-based sintered object can be made to have a smaller amount of pores. It is hence possible to obtain a sintered object having a higher density and to obtain an alumina-based sintered object having a three-point bending strength of 320 MPa or higher.

It is preferable that the alumina-based sintered object according to the first embodiment has a water absorption of 0.2% or less. The water absorption is the smaller, the porosity of the alumina-based sintered object is smaller. Thus the smaller the water absorption is, the denser the alumina-based sintered object is.

Consequently, a thin film can be evenly formed on the surface of the alumina-based sintered object having a water absorption of 0.2% or less.

It is preferable that the alumina-based sintered object according to the first embodiment has an average pore diameter of 5 μm or less. In cases when the alumina-based sintered object has an average pore diameter of 5 μm or less, a thin film can be more evenly formed on the surface of the alumina-based sintered object.

Although the alumina-based sintered object according to the first embodiment may be used as such, the alumina-based sintered object may be used after a dense film is formed on a surface thereof.

The film is obtained, for example, by depositing a film of an yttria material on the alumina-based sintered object using an aerosol deposition method or PVD. The alumina-based sintered object on which a film of an yttria material has been thus deposited has high plasma resistance, is highly inhibited from causing dusting, and is capable of attaining power saving, etc. due to the low-dielectric-loss characteristics of the substrate.

As stated above, in cases when the alumina-based sintered object has a water absorption of 0.2% or less, a thin film can be evenly formed on the surface of this alumina-based sintered object.

Especially in the case where the alumina-based sintered object has an average pore diameter of 5 μm or less, a thin film of yttria can be more evenly deposited on the surface of the alumina-based sintered object.

The film to be formed on the surface of the alumina-based sintered object is not limited to yttria materials. For example, the film may be any of: a composite oxide (YAG) including yttrium oxide and aluminum oxide; erbium oxide; oxides of other rare earth elements; and composite oxides including oxides of rare earth elements.

It is desirable that the surface of the alumina-based sintered object on which a film is to be formed has a surface roughness Ra of less than 0.1 μm. The surface of the alumina-based sintered object may be mirror-polished before film formation, thereby reducing the surface roughness to less than 0.1 pun. Namely, it is desirable that the surface of the alumina-based sintered object on which a film is to be formed has an average pore diameter of 5 μm or less and a surface roughness Ra of less than 0.1 μm.

On the alumina-based sintered object having such a surface, a thin film can be more evenly formed. This thin film is inhibited from peeling off, and particle generation can be inhibited.

The film to be formed on the alumina-based sintered object may be one to be formed on a part of the surface of the alumina-based sintered object. The thickness of the film is not particularly limited. However, the thickness thereof is preferably 1 μm to 20 μm.

The alumina-based sintered object can be produced by a process generally used for producing an alumina-based sintered object. For example, the alumina-based sintered object can be produced by the following process.

First, a $ZrO_2$ powder or an aqueous solution thereof is added to an $Al_2O_3$ powder having a predetermined median diameter. A binder or the like (e.g., PVA) is added thereto to prepare a raw-material powder. This raw-material powder is stirred and mixed by a mixer to obtain a raw-material slurry, which is then granulated.

The resultant granules are molded to thereby produce a molded object. For the molding, use can be made of various methods such as uniaxial press molding, CIP molding, wet molding, and pressure casting.

The molded object is fired at a temperature in the range of 1,600° C. to 1,900° C. for 6 hours or longer in a hydrogen atmosphere, thereby obtaining the alumina-based sintered object.

By thus firing the molded object at 1,600° C. to 1,900° C. in a hydrogen atmosphere, an alumina-based sintered object having a high density can be obtained.

Next, the alumina-based sintered object of a second embodiment according to the second aspect of the present invention is explained.

The alumina-based sintered object according to the second embodiment is an alumina-based sintered object having an Al content, in terms of $Al_2O_3$ content, of 70% by weight or higher, in which the alumina-based sintered object has a Zr content, in terms of $ZrO_2$ content, of 30% by weight or less, a Y content, in terms of $Y_2O_3$ content, of 1% to 10% by weight, an Si content, in terms of $SiO_2$ content, of 170 ppm to 600 ppm, and an Na content, in terms of $Na_2O$ content, of 27 ppm or less, and the Y content, in terms of $Y_2O_3$ content, is not more than the Zr content, in terms of $ZrO_2$ content.

The alumina-based sintered object according to the second embodiment has high flexural strength, has both corrosion resistance and low-dielectric-loss characteristics, and serves as a substrate on which an even and dense film can be deposited.

In the alumina-based sintered object according to the second embodiment, the content of Al, in terms of $Al_2O_3$ content, is 70% by weight or higher. The content of Zr therein, in terms of $ZrO_2$ content, is 30% by weight or less, and the content of Y therein, in terms of $Y_2O_3$ content, is 1% to 10% by weight.

In the alumina-based sintered object according to the second embodiment, a $ZrO_2$ crystal phase has been formed besides the main crystals of $Al_2O_3$. The $ZrO_2$ crystal phase not only contributes to a reduction in the amount of pores but also is inhibited from undergoing abnormal grain growth and has a reduced grain diameter. The $ZrO_2$ crystal phase hence serves to enhance the strength.

However, in case where the Zr content in terms of $ZrO_2$ content exceeds 30% by weight, the Al content in terms of $Al_2O_3$ content is less than 70% by weight and this alumina-based sintered object does not have high resistance to corrosion by highly reactive halogen-based corrosive gases or plasmas thereof. Such Zr contents are hence undesirable.

In addition, in case where the Zr content in terms of $ZrO_2$ content exceeds 30% by weight, the $ZrO_2$ crystal phase is present in an increased amount and this results in a decrease in the strength of the alumina-based sintered object. Furthermore, the dielectric loss tangent tan δ exceeds $10^{-3}$. Such Zr contents are hence undesirable.

Consequently, the Al content in terms of $Al_2O_3$ content is 70% by weight or higher, and the Zr content in terms of $ZrO_2$ content is 30% by weight or less.

Furthermore, in this embodiment, the content of Y, in terms of $Y_2O_3$ content, is 1% to 10% by weight.

In cases when the Zr addition amount is large, this alumina-based sintered object may crack due to the influence of phase transition. Yttrium has the effect of inhibiting the cracking due to the addition of Zr.

With respect to the addition amount of Y, in case where the content of Y, in terms of $Y_2O_3$ content, is less than 1% by weight, the effect of cracking inhibition is too low. In case where Y is added in an amount exceeding 10% by weight, some of the Y reacts with $Al_2O_3$ during the firing step to yield YAG. In case where the YAG is present in too large an amount, the alumina-based sintered object has a reduced three-point bending strength. The content of Y is hence 10% by weight or less.

In addition, in case where the content of Y, in terms of $Y_2O_3$ content, is more than the content of Zr, in terms of $ZrO_2$ content, the alumina-based sintered object has a reduced three-point bending strength, and hence it is not preferable. Therefore, it is preferable that the content of Y, in terms of $Y_2O_3$ content, is not more than the content of Zr, in terms of $ZrO_2$ content.

Any ingredients contained in the alumina-based sintered object according to the second embodiment other than $Al_2O_3$, $ZrO_2$, and $Y_2O_3$ are substances which have unavoidably come into the alumina in the steps for alumina production, as in the first embodiment. Examples thereof include Si, Mg, Na, and Ca.

As in the first embodiment, the content of Si, in terms of $SiO_2$ content, in this alumina-based sintered object is 170 ppm to 600 ppm. The content of Na therein, in terms of $Na_2O$ content, is 27 ppm or less. It is preferable that the content of Mg, in terms of MgO content, is 1.0 to 4.0 times the Si content in terms of $SiO_2$ content.

Furthermore, it is preferable that the content of Ca, in terms of CaO content, is up to 3.0 times the Si content in terms of $SiO_2$ content.

It is preferable that the $Al_2O_3$ crystals contained in the alumina-based sintered object according to the second embodiment have an average crystal grain diameter of 3 μm to 15 μm, as in the first embodiment.

It is preferable that the alumina-based sintered object according to the second embodiment has a water absorption of 0.2% or less, as in the first embodiment.

It is preferable that this alumina-based sintered object has an average pore diameter of 5 μm or less.

Although the alumina-based sintered object according to the second embodiment may be used as such, the alumina-based sintered object may be used after a dense film is formed on a surface thereof, as in the first embodiment.

The film is obtained, for example, by depositing a film of an yttria material on the alumina-based sintered object using an aerosol deposition method or PVD, as in the first embodiment.

As stated above, in cases when the alumina-based sintered object has a water absorption of 0.2% or less, a thin film can be evenly formed on the surface of this alumina-based sintered object.

Especially in the case where the alumina-based sintered object has an average pore diameter of 5 μm or less, a thin film of yttria can be more evenly deposited on the surface of the alumina-based sintered object.

The film to be formed on the surface of the alumina-based sintered object is not limited to yttria materials. For example, the film may be any of: a composite oxide (YAG) including yttrium oxide and aluminum oxide; erbium oxide; oxides of other rare earth elements; and composite oxides including oxides of rare earth elements.

It is desirable that the surface of the alumina-based sintered object on which a film is to be formed has a surface roughness Ra of less than 0.1 μm, as in the first embodiment. The surface of the alumina-based sintered object may be mirror-polished before film formation, thereby reducing the surface roughness to less than 0.1 μm. Namely, it is desirable that the surface of the alumina-based sintered object on which a film is to be formed has an average pore diameter of 5 μm or less and a surface roughness Ra of less than 0.1 μm.

On the alumina-based sintered object having such a surface, a thin film can be more evenly formed. This thin film is inhibited from peeling off, and particle generation can be inhibited.

The film to be formed on the alumina-based sintered object may be one to be formed on a part of the surface of the alumina-based sintered object. The thickness of the film is not particularly limited. However, the thickness thereof is preferably 1 μm to 20 μm.

The alumina-based sintered object can be produced by a process generally used for producing an alumina-based sintered object, as stated above with regard to the first embodiment. For example, the alumina-based sintered object can be produced by the following process.

First, either a $ZrO_2$ powder and a $Y_2O_3$ powder or an aqueous solution of these is added to an $Al_2O_3$ powder having a predetermined median diameter. A binder or the like (e.g., PVA) is added thereto to prepare a raw-material powder. This raw-material powder is stirred and mixed by a mixer to obtain a raw-material slurry, which is then granulated.

The resultant granules are molded to thereby produce a molded object. For the molding, use can be made of various methods such as uniaxial press molding, CIP molding, wet molding, and pressure casting.

The molded object is fired at a temperature in the range of 1,600° C. to 1,900° C. for 6 hours or longer in a hydrogen atmosphere, thereby obtaining the alumina-based sintered object.

By thus firing the molded object at 1,600° C. to 1,900° C. in a hydrogen atmosphere, an alumina-based sintered object having a three-point bending strength of 320 MPa or higher, including $Al_2O_3$ crystals with an average crystal grain diameter of 3 μm to 15 μm, and having a water absorption of 0.2% or less is obtained. This alumina-based sintered object can be obtained as an alumina-based sintered object which has such low-dielectric-loss characteristics that the value of the dielectric loss tangent tan δ at 10 MHz to 20 MHz is $10^{-3}$ or less.

The alumina-based sintered object of a third embodiment according to the third aspect of the present invention is explained.

The alumina-based sintered object according to the third embodiment is an alumina-based sintered object having an Al content, in terms of $Al_2O_3$ content, of 99.8 wt % or higher, in which the alumina-based sintered object has an Si content, in terms of $SiO_2$ content, of 170 ppm to 600 ppm and an Na content, in terms of $Na_2O$ content, of 27 ppm or less, and the alumina-based sintered object has a density of 3.96 g/cm³ or higher.

The alumina-based sintered object according to the third embodiment has both corrosion resistance and low-dielectric-loss characteristics and serves as a substrate on which an even and dense film can be deposited.

The alumina-based sintered object according to the third embodiment has an Al content, in terms of $Al_2O_3$ content, of 99.8 wt % or higher. In case where the content of Al in terms of $Al_2O_3$ content is less than 99.8 wt %, this alumina-based sintered object does not have high resistance to corrosion by highly reactive halogen-based corrosive gases or plasmas thereof. Such Al contents are hence undesirable.

Any ingredients contained in the alumina-based sintered object according to the third embodiment other than $Al_2O_3$ are substances which have unavoidably come into the alumina in the steps for alumina production. Examples thereof include Si, Mg, Na, and Ca.

In the alumina-based sintered object according to the third embodiment, the Si content in terms of $SiO_2$ content is 170 ppm to 600 ppm.

In case where the Si content in terms of $SiO_2$ content is less than 170 ppm, silicates which are necessary for imparting low-dielectric-loss characteristics are not evenly formed, resulting in an increase in dielectric loss and making it impossible to obtain the effect of power saving. Such Si contents are hence undesirable.

Meanwhile, in case where the Si content in terms of $SiO_2$ content exceeds 600 ppm, this alumina-based sintered object has a low density and is not dense. Such Si contents are hence undesirable.

Specifically, the density of the alumina-based sintered object according to the third embodiment is 3.96 g/cm³ or higher.

In the alumina-based sintered object according to the third embodiment, the Na content in terms of $Na_2O$ content is 27 ppm or less. In case where the Na content in terms of $Na_2O$ content exceeds 27 ppm, this alumina-based sintered object has an increased dielectric loss and does not have the effect of power saving. Such Na contents are hence undesirable.

It is preferable that, in the alumina-based sintered object according to the third embodiment, the content of Mg, in terms of MgO content, is 1.0 to 4.0 times the Si content in terms of $SiO_2$ content.

In cases when the content of Mg, in terms of MgO content, is 1.0 to 4.0 times the Si content in terms of $SiO_2$ content, silicates can be formed at grain boundaries of the alumina-based sintered object. Hence, an alumina-based sintered object having a high density and a low dielectric loss can be obtained.

It is preferable that, in the alumina-based sintered object according to the third embodiment, the content of Ca, in terms of CaO content, is up to 3.0 times the Si content in terms of $SiO_2$ content.

In cases when the content of Ca, in terms of CaO content, is up to 3.0 times the Si content in terms of $SiO_2$ content, silicates can be formed at grain boundaries. Hence, an alumina-based sintered object having a low dielectric loss can be obtained.

It is preferable that, in the alumina-based sintered object according to the third embodiment, the $Al_2O_3$ crystals have an average crystal grain diameter of 3 μm to 40 μm. The average crystal grain diameter thereof is more preferably 10 μm to 25 μm.

In cases when the $Al_2O_3$ crystals in the alumina-based sintered object have an average crystal grain diameter of 3

μm to 40 μm, this alumina-based sintered object can be made to have a smaller amount of pores. It is hence possible to obtain a sintered object having a higher density and to obtain an alumina-based sintered object having a three-point bending strength of 250 MPa or higher.

It is preferable that the alumina-based sintered object according to the third embodiment has an average pore diameter of 5 μm or less. In cases when the alumina-based sintered object has an average pore diameter of 5 μm or less, a thin film can be evenly formed on the surface of the alumina-based sintered object.

Although the alumina-based sintered object according to the third embodiment may be used as such, the alumina-based sintered object may be used after a dense film is formed on a surface thereof.

The film is obtained, for example, by depositing a film of an yttria material on the alumina-based sintered object using an aerosol deposition method or PVD. The alumina-based sintered object on which a film of an yttria material has been thus deposited has high plasma resistance, is highly inhibited from causing dusting, and is capable of attaining power saving, etc. due to the low-dielectric-loss characteristics of the substrate.

As stated above, in cases when the alumina-based sintered object has an average pore diameter of 5 μm or less, a thin film of yttria can be evenly deposited on the surface of the alumina-based sintered object.

The film to be formed on the surface of the alumina-based sintered object is not limited to yttria materials. For example, the film may be any of: a composite oxide (YAG) including yttrium oxide and aluminum oxide; erbium oxide; oxides of other rare earth elements; and composite oxides including oxides of rare earth elements.

It is desirable that the surface of the alumina-based sintered object on which a film is to be formed has a surface roughness Ra of less than 0.1 μm. The surface of the alumina-based sintered object may be mirror-polished before film formation, thereby reducing the surface roughness to less than 0.1 μm. Namely, it is desirable that the surface of the alumina-based sintered object on which a film is to be formed has an average pore diameter of 5 μm or less and a surface roughness Ra of less than 0.1 μm.

On the alumina-based sintered object having such a surface, a thin film can be more evenly formed. This thin film is inhibited from peeling off, and particle generation can be inhibited.

The film to be formed on the alumina-based sintered object may be one to be formed on a part of the surface of the alumina-based sintered object. The thickness of the film is not particularly limited. However, the thickness thereof is preferably 1 μm to 20 μm.

The alumina-based sintered object can be produced by a process generally used for producing an alumina-based sintered object. For example, the alumina-based sintered object can be produced by the following process.

First, a binder or the like (e.g., PVA) is added to an $Al_2O_3$ powder having a predetermined median diameter to prepare a raw-material powder. This raw-material powder is stirred and mixed by a mixer to obtain a raw-material slurry, which is then granulated.

The resultant granules are molded to thereby produce a molded object. For the molding, use can be made of various methods such as uniaxial press molding, CIP molding, wet molding, and pressure casting.

The molded object is fired at a temperature in the range of 1,600° C. to 1,900° C. for 6 hours or longer in a hydrogen atmosphere, thereby obtaining the alumina-based sintered object.

By thus firing the molded object at 1,600° C. to 1,900° C. in a hydrogen atmosphere, an alumina-based sintered object having a high density can be obtained.

EXAMPLES

The present invention is explained below in detail by reference to Examples, but the invention should not be construed as being limited by the following Examples.

Experiment 1A

As shown in Table 1, a $ZrO_2$ powder was added to an alumina powder having a median diameter of 2 μm or less using water as a medium, and PVA was added thereto to prepare a raw-material powder. This raw-material powder was stirred and mixed for 16 hours or longer to obtain a raw-material slurry. This raw-material slurry was granulated, and the granules were packed into a molding die and molded by CIP at a molding pressure of 1.5 tons.

Furthermore, the resultant molded object was subjected to a degreasing step in the air and then fired at 1,600° C. in a hydrogen atmosphere. Thus, samples of Examples 1A to 7A and Comparative Examples 1A to 6A were produced.

$SiO_2$ and $Na_2O$ were added according to need so as to give sintered objects each having an Si content and an Na content within the ranges according to the present invention.

The samples of Examples 1A to 7A and Comparative Examples 1A to 6A were evaluated for water absorption, average $Al_2O_3$ crystal grain diameter, dielectric loss tangent tan δ, and three-point bending strength. The results thereof are shown in Table 1.

The average alumina crystal grain diameter was determined by mirror-polishing a cross-section of each sample, subjecting the polished cross-section to thermal etching, subsequently taking a photograph of the cross-section with a scanning electron microscope (SEM), and calculating the average crystal grain diameter by image analysis.

Figure 1:
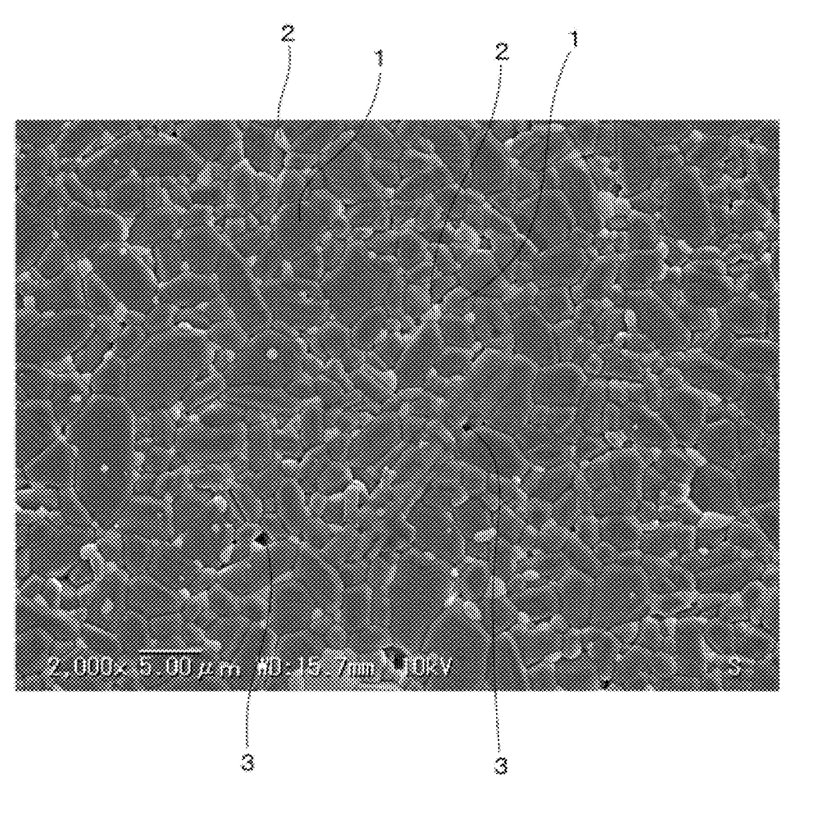
FIG. 1 shows a photograph of a cross-section obtained in Example 1A.

The photograph of the cross-section taken with the scanning electron microscope (SEM) in Example 1A is shown in FIG. 1.

The three-point bending strength was measured in accordance with JIS R 1601:2008. The purity of each sintered object was determined by ICP emission analysis. The dielectric loss tangent tan δ was determined at frequencies of 10 MHz to 20 MHz using an impedance analyzer.

The water absorption was determined by obtaining dry weight W1 and weight in water W2 by the same method as that described in JIS R 1634:1998 and calculating the water absorption using the following equation.

Water absorption (%)=$(W2-W1)/W1×100$

Furthermore, a surface of each of the samples (alumina-based sintered object) of Examples 1A to 7A and Comparative Examples 1A to 6A obtained above was mirror-polished so as to result in Ra<0.1 μm, and the polished surface was coated with an yttrium oxide material in a thickness of 1 μm by the aerosol deposition method.

The deposition material was dried at 270° C. for 12 hours or longer as a pretreatment, and the deposition was then conducted by aerosol jetting under the following conditions:

Sample temperature, room temperature; powder container temperature, 150° C.; raising/conveying gas, He; powder raising rate, 3 L/min; powder conveying rate, 10 L/min; powder collision angle, 60σ; nozzle opening shape, 5×0.3 mm; sample-to-nozzle distance, 5 mm; sample traveling speed, 200 mm/min; number of passes for deposition, 10.

The thus-obtained thin-film-coated samples of Examples 1A to 7A and Comparative Examples 1A to 6A were each examined for surface state over a range of about 200 μm×200 μm using a scanning electron microscope. From the image obtained, the diameters of voids and the number of the voids were determined using an image analysis software. As shown in Table 1, each sample which satisfied the number of voids of 100 or less was regarded as having been coated with an even film and indicated by "A", and each sample which did not satisfy the requirement was regarded as having been coated with an uneven film and indicated by "B".

In Comparative Example 4A, the alumina-based sintered object had a low three-point bending strength and a tan δ exceeding $10^{-3}$ because of the high Si and Na contents. In addition, this alumina-based sintered object had a large average $Al_2O_3$ crystal grain diameter, and it was found that formation of an even film on the surface of this alumina-based sintered object was difficult.

In Comparative Example 5A, the alumina-based sintered object had a tan δ exceeding $10^{-3}$ because of the low Si content. It was found that formation of an even film on the surface of this alumina-based sintered object was difficult.

In Comparative Example 6A, the alumina-based sintered object had a tan δ exceeding $10^{-3}$ because of the high Na content. This alumina-based sintered object was found to have poor dielectric loss characteristics.

TABLE 1

| | Al content (in terms of $Al_2O_3$) (wt %) | Zr content (in terms of $ZrO_2$) (wt %) | Si content (in terms of $SiO_2$) (ppm) | Na content (in terms of $Na_2O$) (ppm) | Three-point bending strength (MPa) | tanδ @10 to 20 MHz | Average crystal-grain diameter (μm) | Water absorption (%) | State of voids in thin-film surface: Number of voids ≤ 100; Average diameter ≤ 5 μm |
|---|---|---|---|---|---|---|---|---|---|
| Example 1A | 90 | 10 | 300 | 10 | 350 | $<10^{-3}$ | 5 | ≤0.2 | A |
| Example 2A | 90 | 10 | 300 | 27 | 350 | $<10^{-3}$ | 5 | ≤0.2 | A |
| Example 3A | 90 | 10 | 300 | 2 | 350 | $<10^{-3}$ | 5 | ≤0.2 | A |
| Example 4A | 90 | 10 | 170 | 10 | 340 | $<10^{-3}$ | 4 | ≤0.2 | A |
| Example 5A | 90 | 10 | 600 | 10 | 340 | $<10^{-3}$ | 6 | ≤0.2 | A |
| Example 6A | 70 | 30 | 300 | 10 | 320 | $<10^{-3}$ | 3 | ≤0.2 | A |
| Example 7A | 99 | 1 | 300 | 10 | 325 | $<10^{-3}$ | 12 | ≤0.2 | A |
| Comparative Example 1A | 50 | 50 | 300 | 10 | 250 | $>10^{-3}$ | 3 | >0.2 | B |
| Comparative Example 2A | 50 | 50 | 800 | 10 | 230 | $>10^{-3}$ | 3 | >0.2 | B |
| Comparative Example 3A | 90 | 10 | 800 | 10 | 310 | $<10^{-3}$ | 16 | >0.2 | B |
| Comparative Example 4A | 90 | 10 | 800 | 50 | 310 | $>10^{-3}$ | 16 | >0.2 | B |
| Comparative Example 5A | 90 | 10 | 5 | 10 | 330 | $>10^{-3}$ | 5 | >0.2 | B |
| Comparative Example 6A | 90 | 10 | 300 | 50 | 350 | $>10^{-3}$ | 5 | ≤0.2 | A |

Table 1 shows that the samples of Examples 1A to 7A each had a three-point bending strength of 320 MPa or higher, a tan δ of less than $10^{-3}$, an average alumina crystal grain diameter of 3 μm to 15 μm, and a water absorption of 0.2% or less. It was thus ascertained that these samples were alumina-based sintered objects which had high strength, were dense, and had low-dielectric-loss characteristics.

Furthermore, as FIG. 1 shows, it is ascertained that $ZrO_2$ crystal grains having a small diameter had come into the spaces between alumina crystal grains to inhibit the inclusion of pores.

Furthermore, in each of the thin films, the number of surface voids in a region of about 200 μm×200 μm was 100 or less and the average diameter thereof was 5 μm or less. It was thus ascertained that an even film was able to be formed.

In Comparative Examples 1A and 2A, the alumina-based sintered objects each had a low three-point bending strength and a tan δ exceeding $10^{-3}$ because of the too high Zr content. Furthermore, these alumina-based sintered objects had cracked.

In Comparative Example 3A, the alumina-based sintered object had a low three-point bending strength and a large average $Al_2O_3$ crystal grain diameter because of the high Si content. It was found that formation of an even film on the surface of this alumina-based sintered object was difficult.

Experiment 2A

Next, as shown in Table 2, a $ZrO_2$ powder and a $Y_2O_3$ powder were added to an alumina powder having a median diameter of 2 μm or less using water as a medium, and PVA was added thereto to prepare a raw-material powder. This raw-material powder was stirred and mixed for 16 hours or longer to obtain a raw-material slurry. This raw-material slurry was granulated, and the granules were packed into a molding die and molded by CIP at a molding pressure of 1.5 tons.

Furthermore, the resultant molded object was subjected to a degreasing step in the air and then fired at 1,600° C. in a hydrogen atmosphere. Thus, samples of Examples 8A to 12A and Comparative Examples 7A and 8A were produced.

$SiO_2$ and $Na_2O$ were added according to need so as to give sintered objects having an Si content and an Na content within the ranges according to the present invention.

As in Experiment 1A, the samples of Examples 8A to 12A and Comparative Examples 7A and 8A were evaluated for water absorption, average $Al_2O_3$ crystal grain diameter, dielectric loss tangent tan δ, and three-point bending strength. The results thereof are shown in Table 2.

Furthermore, as in Experiment 1A, a surface of each of the samples (alumina-based sintered object) of Examples 8A to 12A and Comparative Examples 7A and 8A obtained above was mirror-polished so as to result in Ra<0.1 µm, and the polished surface was coated with an yttrium oxide material in a thickness of 1 µm by the aerosol deposition method. The deposition material was dried at 270° C. for 12 hours or longer as a pretreatment, and the deposition was then conducted by aerosol jetting under the same conditions as in Example 1A.

The thus-obtained thin-film-coated samples of Examples 8A to 12A and Comparative Examples 7A and 8A were each examined for surface state over a range of about 200 µm×200 µm using a scanning electron microscope in the same manner as in Experiment 1A. From the image obtained, the diameters of voids and the number of the voids were determined using an image analysis software. As shown in Table 2, each sample which satisfied the number of voids of 100 or less was regarded as having been coated with an even film and indicated by "A", and each sample which did not satisfy the requirement was regarded as having been coated with an uneven film and indicated by "B", as in Experiment 1A.

atmosphere at 1,800° C. (Examples 1B to 4B and 7B and Comparative Examples 1B to 4B), 1,700° C. (Example 5B and Comparative Example 5B), or 1,900° C. (Examples 6B and Comparative Example 6B). Thus, samples of Examples 1B to 7B and Comparative Examples 1B to 6B were produced.

$SiO_2$ and $Na_2O$ were added according to need so as to give sintered objects each having an Si content and an Na content within the ranges according to the present invention. Furthermore, the median diameter of the alumina powder was changed so that the sintered objects each had a density within the range according to the present invention.

The samples of Examples 1B to 7B and Comparative Examples 1B to 6B were evaluated for density and dielectric loss tangent tan. The results thereof are shown in Table 3.

In Experiment 1B and in the following Experiments 2B to 4B, the density was determined in accordance with JIS R 1634:1998. The tan δ was determined at frequencies of 10 MHz 20 MHz using an impedance analyzer. Furthermore, the average alumina crystal grain diameter was determined

TABLE 2

|  | Al content (in terms of $Al_2O_3$) (wt %) | Zr content (in terms of $ZrO_2$) (wt %) | Y content (in terms of $Y_2O_3$) (wt %) | Si content (in terms of $SiO_2$) (ppm) | Na content (in terms of $Na_2O$) (ppm) | Three-point bending strength (MPa) | tanδ @10 to 20 MHz | Average crystal-grain diameter (µm) | Water absorption (%) | State of voids in thin-film surface: Number of voids ≤ 100; Average diameter ≤ 5 µm |
|---|---|---|---|---|---|---|---|---|---|---|
| Example 8A | 85 | 10 | 5 | 300 | 10 | 350 | <$10^{-3}$ | 7 | ≤0.2 | A |
| Example 9A | 90 | 5 | 5 | 300 | 10 | 340 | <$10^{-3}$ | 5 | ≤0.2 | A |
| Example 10A | 65 | 30 | 5 | 300 | 10 | 360 | <$10^{-3}$ | 4 | ≤0.2 | A |
| Example 11A | 89 | 10 | 1 | 300 | 10 | 350 | <$10^{-3}$ | 5 | ≤0.2 | A |
| Example 12A | 80 | 10 | 10 | 300 | 10 | 320 | <$10^{-3}$ | 10 | ≤0.2 | A |
| Comparative Example 7A | 70 | 10 | 20 | 300 | 10 | 290 | <$10^{-3}$ | 16 | ≤0.2 | A |
| Comparative Example 8A | 60 | 10 | 30 | 300 | 10 | 250 | <$10^{-3}$ | 18 | ≤0.2 | A |

Table 2 shows that the samples of Examples 8A to 12A each had a three-point bending strength of 320 MPa or higher, a tan δ of less than $10^{-3}$, an average alumina crystal grain diameter of 4 µm to 10 µm, and a water absorption of 0.2% or less. It was thus ascertained that these samples were alumina-based sintered objects which had high strength, were dense, and had low-dielectric-loss characteristics.

Furthermore, in each of the thin films, the number of surface voids in a region of about 200 µm×200 µm was 100 or less and the average diameter thereof was 5 µm or less. It was thus ascertained that an even film was able to be formed.

In Comparative Examples 7A and 8A, the alumina-based sintered objects each had a large average $Al_2O_3$ crystal grain diameter because of the high Y content. In addition, these alumina-based sintered objects each had a low three-point bending strength.

Experiment 1B

As shown in Table 3, PVA was added to an alumina powder having a purity of 99.7 wt % to 99.9 wt % and a median diameter of 2 µm or less to prepare a raw-material powder. This raw-material powder was stirred and mixed for 16 hours or longer to obtain a raw-material slurry. This raw-material slurry was granulated, and the granules were packed into a molding die and molded by CIP at a molding pressure of 1.5 tons.

Furthermore, the resultant molded object was subjected to a degreasing step in the air and then fired in a hydrogen by mirror-polishing a cross-section of each sample, subjecting the polished cross-section to thermal etching, subsequently taking a photograph of the cross-section with a scanning electron microscope (SEM), and calculating the average crystal grain diameter by image analysis. The three-point bending strength was measured in accordance with JIS R 1601:2008. The purity of each sintered object was determined by ICP emission analysis.

Furthermore, a surface of each of the samples (alumina-based sintered object) of Examples 1B to 7B and Comparative Examples 1B to 6B obtained above was mirror-polished so as to result in Ra<0.1 µm, and the polished surface was coated with an yttrium oxide material in a thickness of 1 µm by the aerosol deposition method.

The deposition material was dried at 270° C. for 12 hours or longer as a pretreatment, and the deposition was then conducted by aerosol jetting under the following conditions: Sample temperature, room temperature; powder container temperature, 150° C.; raising/conveying gas, He: powder raising rate, 3 L/min; powder conveying rate, 10 L/min; powder collision angle, 60°; nozzle opening shape, 5×0.3 mm; sample-to-nozzle distance, 5 mm; sample traveling speed, 200 mm/min: number of passes for deposition, 10.

The thus-obtained thin-film-coated samples of Examples 1B to 7B and Comparative Examples 1B to 6B were each examined for surface state over a range of about 200 µm×200 µm using a scanning electron microscope. From the image obtained, the diameters of voids and the number of the voids were determined using an image analysis software. As shown in Table 3, each sample which satisfied the number of voids of 100 or less was regarded as having been coated with an even film and indicated by "A", and each sample which did not satisfy the requirement was regarded as having been coated with an uneven film and indicated by "B". Moreover, especially preferred samples in which the average void diameter was 5 μm or less and the number of voids was less than 80 were indicated by "AA". Consequently, "A" indicates that the number of voids was 80 to 100. The criteria for "AA", "A" and "B" apply also in Tables 4 to 6, which will be given later.

of less than 3.96 g/cm³ and a tan δ exceeding $10^{-3}$. Namely, this alumina-based sintered object was found to have poor denseness.

The thin films formed on the samples of Examples 1B to 7B and Comparative Examples 2B each had a surface state in which the average diameter of voids was 5 μm or less and the number of the voids in a region of about 200 μm×200 μm was 100 or less (less than 80). It was found that an even film was able to be formed thereon.

TABLE 3

|  | Purity of alumina (wt %) | Si content (in terms of SiO₂) (ppm) | Na content (in terms of Na₂O) (ppm) | Density of sintered object (g/cm³) | tanδ @10 to 20 MHz | State of voids in thin-film surface: Number of voids ≤ 100; Average diameter ≤ 5 μm |
|---|---|---|---|---|---|---|
| Example 1B | 99.9 | 385 | 4.3 | 3.99 | $<10^{-3}$ | AA |
| Example 2B | 99.9 | 363 | 18.9 | 4.00 | $<10^{-3}$ | AA |
| Example 3B | 99.9 | 492 | 27.0 | 4.00 | $<10^{-3}$ | AA |
| Example 4B | 99.9 | 600 | 13.0 | 3.99 | $<10^{-3}$ | AA |
| Example 5B | 99.9 | 471 | 6.8 | 3.98 | $<10^{-3}$ | AA |
| Example 6B | 99.9 | 321 | 1.1 | 4.00 | $<10^{-3}$ | AA |
| Example 7B | 99.9 | 203 | 3.4 | 3.99 | $<10^{-3}$ | AA |
| Comparative Example 1B | 99.9 | 407 | 41.2 | 3.95 | $>10^{-3}$ | B |
| Comparative Example 2B | 99.9 | 54 | 32.4 | 3.99 | $>10^{-3}$ | AA |
| Comparative Example 3B | 99.8 | 1305 | 6.3 | 3.94 | $<10^{-3}$ | B |
| Comparative Example 4B | 99.8 | 1070 | 8.6 | 3.95 | $<10^{-3}$ | B |
| Comparative Example 5B | 99.7 | 600 | 17.5 | 3.95 | $>10^{-3}$ | B |
| Comparative Example 6B | 99.7 | 600 | 27.0 | 3.95 | $>10^{-3}$ | B |

Table 3 shows that the samples of Examples 1B to 7B each had a density of 3.96 g/cm³ or higher and a tan δ of less than $10^{-3}$. It was thus ascertained that these samples were alumina-based sintered objects which were dense and had low-dielectric-loss characteristics.

In Comparative Example 1B, the alumina-based sintered object had a density of less than 3.96 g/cm³ because of the high Na content, and had a tan δ exceeding $10^{-3}$. This alumina-based sintered object was thus found to be poor in denseness and dielectric loss characteristics.

In Comparative Example 2B, the alumina-based sintered object had a tan δ exceeding $10^{-3}$ because of the low Si content and high Na content. Namely, this alumina-based sintered object was found to have poor dielectric loss characteristics.

In Comparative Example 3B, the alumina-based sintered object had a density of less than 3.96 g/cm³ because of the high Si content. Namely, this alumina-based sintered object was found to have poor denseness.

In Comparative Example 4B, densification had been inhibited due to the too high Si content, and the alumina-based sintered object had a density of less than 3.96 g/cm³. Namely, this alumina-based sintered object was found to have poor denseness, making it difficult to form a dense film on the surface of the alumina-based sintered object.

In Comparative Example 5B, the purity of the alumina was low and the alumina-based sintered object had a density of less than 3.96 g/cm³ and a tan δ exceeding $10^3$. Namely, this alumina-based sintered object was found to have poor denseness.

In Comparative Example 6B, the purity of the alumina was low and the alumina-based sintered object had a density Experiment 2B Next, as shown in Table 4, PVA was added to an alumina powder having a purity of 99.8 wt % to 99.9 wt % and a median diameter of 2 μm or less to prepare a raw-material powder. This raw-material powder was stirred and mixed for 16 hours or longer to obtain a raw-material slurry. This raw-material slurry was granulated, and the granules were packed into a molding die and molded by CIP at a molding pressure of 1.5 tons.

Furthermore, the resultant molded object was subjected to a degreasing step in the air and then fired in a hydrogen atmosphere at 1,800° C. Thus, samples of Examples 9B, 118B, 13B, and 15B were produced. Meanwhile, the molded object was subjected to a degreasing step in the air and then fired in a hydrogen atmosphere at 1,900° C. Thus, samples of Examples 8B, 10B, 12B, and 14B were produced.

As shown in Table 4, SiO₂ and Na₂O were added so as to give sintered objects each having an Si content and an Na content within the ranges according to the present invention, and MgO was added so that the ratio of the content of Mg, in terms of MgO, to the Si content, in terms of SiO₂, was in the range of 0.9 to 4.1. Furthermore, the median diameter of the alumina powder was changed so that the sintered objects each had a density within the range according to the present invention.

The samples of Examples 8B to 15B were evaluated for density and dielectric loss tangent tan δ. The results thereof are shown in Table 4.

As Examples 8B, 9B, 12B, and 13B in Table 4 show, it was found that sintered objects having higher densities of 3.99 g/cm³ and 4.00 g/cm³ were able to be obtained.

Furthermore, as in Experiment 1B, a surface of each of the samples (alumina-based sintered object) of Examples 8B to 15B was mirror-polished so as to result in Ra<0.1 μm, and the polished surface was coated with an yttrium oxide material in a thickness of 1 μm by the aerosol deposition method. The state of the surface of the thin film was examined. The results thereof are shown in Table 4.

As Table 4 shows, the thin films formed on the samples of Examples 8B to 15B each had a surface state in which the average diameter of voids was 5 μm or less and the number of the voids in a region of about 200 μm×200 μm was 100 or less (less than 80). It was found that an even film was able to be formed thereon.

subsequently taking a photograph of the cross-section with a scanning electron microscope (SEM), and calculating the average crystal grain diameter by image analysis. The three-point bending strength was measured in accordance with JIS R 1601:2008. The purity of each sintered object was determined by ICP emission analysis.

As a result, it was found that sintered objects each having a density of 3.97 g/cm$^3$ or higher and a three-point bending strength of 250 MPa or higher were obtained as shown by Examples 8B and 16B and Examples 12B and 18B in Table 5.

TABLE 4

|  | Purity of alumina (wt %) | Si content (in terms of SiO$_2$) (ppm) | Na content (in terms of Na$_2$O) (ppm) | Ratio of Mg content to Si content | Density of sintered object (g/cm$^3$) | tanδ @10 to 20 MHz | State of voids in thin-film surface: Number of voids ≤ 100; Average diameter ≤ 5 μm |
|---|---|---|---|---|---|---|---|
| Example 8B | 99.8 | 600 | 13.0 | 4.0 | 3.99 | <10$^{-3}$ | AA |
| Example 9B | 99.9 | 600 | 13.0 | 1.0 | 3.99 | <10$^{-3}$ | AA |
| Example 10B | 99.9 | 600 | 13.0 | 0.9 | 3.98 | <10$^{-3}$ | AA |
| Example 11B | 99.8 | 600 | 13.0 | 4.1 | 3.97 | <10$^{-3}$ | AA |
| Example 12B | 99.9 | 170 | 13.0 | 4.0 | 4.00 | <10$^{-3}$ | AA |
| Example 13B | 99.9 | 170 | 13.0 | 1.0 | 4.00 | <10$^{-3}$ | AA |
| Example 14B | 99.9 | 170 | 13.0 | 0.9 | 3.98 | <10$^{-3}$ | AA |
| Example 15B | 99.9 | 170 | 13.0 | 4.1 | 3.98 | <10$^{-3}$ | AA |

Experiment 3B

Next, as shown in Table 5, PVA was added to an alumina powder having a purity of 99.8 wt % to 99.9 wt % and a median diameter of 2 μm or less to prepare a raw-material powder. This raw-material powder was stirred and mixed for 16 hours or longer to obtain a raw-material slurry. This raw-material slurry was granulated, and the granules were packed into a molding die and molded by CIP at a molding pressure of 1.5 tons.

Furthermore, the resultant molded object was subjected to a degreasing step in the air and then fired in a hydrogen atmosphere at 1,600° C. Thus, samples of Examples 16B, 17B, 18B, and 19B were produced.

The samples of Examples 16B, 17B, 18B, and 19B were evaluated for density, average Al$_2$O$_3$ crystal grain diameter, dielectric loss tangent tan δ, and three-point bending strength. The samples of Examples 8B, 10B, 12B, and 14B described above were also evaluated for average Al$_2$O$_3$ crystal grain diameter and three-point bending strength. The results thereof are shown in Table 5.

The average alumina crystal grain diameter was determined by mirror-polishing a cross-section of each sample, subjecting the polished cross-section to thermal etching, Furthermore, as in Experiment 1B, a surface of each of the samples (alumina-based sintered object) of Examples 16B to 19B was mirror-polished so as to result in Ra<0.1 μm, and the polished surface was coated with an yttrium oxide material in a thickness of 1 μm by the aerosol deposition method. The state of the surface of the thin film was examined. The results thereof are shown in Table 5.

As Table 5 shows, the thin films formed on the samples of Examples 16B and 18B each had a surface state in which the average diameter of voids was 5 μm or less and the number of the voids in a region of about 200 μm×200 μm was 100 or less (less than 80). It was found that an even film was able to be formed thereon. Meanwhile, the thin films formed on the samples of Examples 17B and 19B each had a surface state in which the average diameter of voids was 5 μm or less and the number of the voids in a region of about 200 μm×200 μm was 80 to 100. It was found that an even film was able to be formed thereon.

TABLE 5

|  | Si content (in terms of SiO$_2$) (ppm) | Na content (in terms of Na$_2$O) (ppm) | Average crystal grain diameter (μm) | Density of sintered object (g/cm$^3$) | tanδ @10 to 20 MHz | Three-point bending strength (MPa) | State of voids in thin-film surface: Number of voids ≤ 100; Average diameter ≤ 5 μm |
|---|---|---|---|---|---|---|---|
| Example 16B | 600 | 13.0 | 3.0 | 3.97 | <10$^{-3}$ | 300 | AA |
| Example 8B | 600 | 13.0 | 40.0 | 3.99 | <10$^{-3}$ | 270 | AA |
| Example 17B | 600 | 13.0 | 2.0 | 3.96 | <10$^{-3}$ | 310 | A |
| Example 10B | 600 | 13.0 | 45.0 | 3.98 | <10$^{-3}$ | 240 | AA |
| Example 18B | 170 | 13.0 | 3.0 | 3.97 | <10$^{-3}$ | 315 | AA |
| Example 12B | 170 | 13.0 | 40.0 | 4.00 | <10$^{-3}$ | 270 | AA |
| Example 19B | 170 | 13.0 | 2.0 | 3.96 | <10$^{-3}$ | 320 | A |
| Example 14B | 170 | 13.0 | 45.0 | 3.98 | <10$^{-3}$ | 245 | AA |

Experiment 4B

Next, PVA was added to an alumina powder having the same alumina purity and median diameter as in Example 18B to prepare a raw-material powder. This raw-material powder was stirred and mixed for 16 hours or longer to obtain a raw-material slurry. This raw-material slurry was granulated, and the granules were packed into a molding die and molded by CIP at a molding pressure of 1.5 tons.

Furthermore, the resultant molded object was subjected to a degreasing step in the air and then fired under the conditions shown in Table 6. Thus, samples of Examples 20B to 22B and Comparative Examples 7B to 10B were produced.

The samples of Examples 20B to 22B and Comparative Examples 7B to 10B were evaluated for density and dielectric loss tangent tan. The results thereof are shown in Table 6 together with the results obtained in Example 18B.

Furthermore, as in Experiment 1B, a surface of each of the samples (alumina-based sintered object) of Examples 20B to 22B and Comparative Examples 7B to 10B was mirror-polished so as to result in Ra<0.1 μm, and the polished surface was coated with an yttrium oxide material in a thickness of 1 μm by the aerosol deposition method. The state of the surface of the thin film was examined. The results thereof are shown in Table 6 together with the results obtained in Example 18B.

TABLE 6

| | Firing atmosphere | Firing temperature (° C.) | Density of sintered object (g/cm$^3$) | tanδ @10 to 20 MHz | State of voids in thin-film surface: Number of voids ≤100; Average diameter ≤5 μm |
|---|---|---|---|---|---|
| Example 18B | hydrogen | 1600 | 3.97 | <10$^{-3}$ | AA |
| Example 20B | hydrogen | 1700 | 3.98 | <10$^{-3}$ | AA |
| Example 21B | hydrogen | 1800 | 3.99 | <10$^{-3}$ | AA |
| Example 22B | hydrogen | 1900 | 4.00 | <10$^{-3}$ | AA |
| Comparative Example 7B | hydrogen | 1500 | 3.81 | <10$^{-3}$ | B |
| Comparative Example 8B | hydrogen | 2000 | 4.00 | >10$^{-3}$ | AA |
| Comparative Example 9B | air | 1600 | 3.91 | >10$^{-3}$ | B |
| Comparative Example 10B | air | 1800 | 3.95 | >10$^{-3}$ | B |

It was found from Examples 18B and 20B to 22B that the sintered objects obtained through firing in a hydrogen atmosphere at 1,600° C. to 1.900° C. each had a density of 3.96 g/cm$^3$ or higher and a dielectric loss tangent tan δ of less than 10$^{-3}$.

Furthermore, as Table 6 shows, the thin films formed on the samples of Examples 18B and 20B to 22B each had a surface state in which the average diameter of voids was 5 μm or less and the number of the voids in a region of about 200 μm×200 μm was 100 or less (less than 80). It was found that an even film was able to be formed thereon.

This application is based on a Japanese patent application filed on Oct. 5, 2017 (Application No. 2017-195292), a Japanese patent application filed on Sep. 25, 2018 (Application No. 2018-178652), and a Japanese patent application filed on Sep. 26, 2018 (Application No. 2018-180299), the contents thereof being incorporated herein by reference.

INDUSTRIAL APPLICABILITY

The present invention is usable as constituent members for use in, for example, production devices in the field of semiconductor production and the field of liquid-crystal display device production. For example, the present invention is suitable for use as members for use in plasma treatment devices, etchers for semiconductor/liquid-crystal display device production, CVD devices, etc. The alumina-based sintered objects according to the present invention may be used as such, or may be used as plasma-resistant members after a plasma-resistant corrosion-resistant film or corrosion-resistant layer is formed on a part or all of the surfaces of the alumina-based sintered objects as substrates.

REFERENCE SIGNS LIST

1 Al$_2$O$_3$ crystal grain
2 ZrO$_2$ crystal grain
3 Pore

The invention claimed is:

1. An alumina-based sintered object having an Al content, in terms of Al$_2$O$_3$ content, of 99.8 wt % or higher,
wherein the alumina-based sintered object has an Si content, in terms of SiO$_2$ content, of 321 ppm to 600 ppm and an Na content, in terms of Na$_2$O content, of more than zero and 27 ppm or less, and
wherein the alumina-based sintered object has a density of 3.96 g/cm$^3$ or higher and an average pore diameter of 5 μm or less.

2. The alumina-based sintered object according to claim 1, containing Mg in an amount which, in terms of MgO content, is 1.0 to 4.0 times the Si content in terms of SiO$_2$ content.

3. The alumina-based sintered object according to claim 1, containing Ca in an amount which, in terms of CaO content, is up to 3.0 times the Si content in terms of SiO$_2$ content.

4. The alumina-based sintered object according to claim 1, wherein Al$_2$O$_3$ crystals contained in the alumina-based sintered object have an average crystal grain diameter of 3 μm to 40 μm.

5. The alumina-based sintered object according to claim 1, wherein a corrosion-resistant film or a corrosion-resistant layer is formed on at least a part of the alumina-based sintered object.

6. The alumina-based sintered object according to claim 1, wherein the alumina-based sintered object has a surface roughness Ra of less than 0.1 μm.

7. The alumina-based sintered object according to claim 1, wherein the Na content, in terms of the Na$_2$O content, is in a range from 2 ppm to 27 ppm.

8. The alumina-based sintered object according to claim 1, wherein the Na content, in terms of the Na$_2$O content, is in a range from 10 ppm to 27 ppm.

9. A process for producing the alumina-based sintered object according to claim 4, the process comprising: granulating and molding a raw-material powder to obtain a molded object, and firing the molded object in a hydrogen atmosphere at 1,600° C. to 1,900° C.

* * * * *